United States Patent
Hodge et al.

(10) Patent No.: US 9,625,654 B2
(45) Date of Patent: Apr. 18, 2017

(54) CONNECTOR WITH INTERFACE PROTECTION

(71) Applicant: Molex, LLC, Lisle, IL (US)

(72) Inventors: Malcolm H. Hodge, Chicago, IL (US); B. Daniel Szilagyi, Naperville, IL (US)

(73) Assignee: Molex, LLC, Lisle, IL (US)

( * ) Notice: Subject to any disclaimer, the term of this patent is extended or adjusted under 35 U.S.C. 154(b) by 54 days.

(21) Appl. No.: 14/221,390

(22) Filed: Mar. 21, 2014

(65) Prior Publication Data

US 2014/0286609 A1    Sep. 25, 2014

Related U.S. Application Data

(60) Provisional application No. 61/804,249, filed on Mar. 22, 2013.

(51) Int. Cl.
G02B 6/36 (2006.01)
G02B 6/38 (2006.01)

(52) U.S. Cl.
CPC ......... *G02B 6/3817* (2013.01); *G02B 6/3849* (2013.01); *G02B 6/3885* (2013.01); *G02B 6/3898* (2013.01); *G02B 6/3853* (2013.01); *Y10T 29/49826* (2015.01); *Y10T 29/53* (2015.01)

(58) Field of Classification Search
CPC .................................................. G02B 6/3817
See application file for complete search history.

(56) References Cited

U.S. PATENT DOCUMENTS

| | | | | |
|---|---|---|---|---|
| 7,241,057 B2* | 7/2007 | Koreeda | ............... | G02B 6/3849 385/139 |
| 8,897,611 B2* | 11/2014 | Genier | ................. | G02B 6/3514 385/33 |
| 2006/0210224 A1* | 9/2006 | Koreeda | ............... | G02B 6/3849 385/70 |
| 2014/0341510 A1* | 11/2014 | Hodge | ................. | G02B 6/3849 385/60 |

* cited by examiner

*Primary Examiner* — Sung Pak
(74) *Attorney, Agent, or Firm* — Jeffrey K. Jacobs

(57) ABSTRACT

An optical fiber assembly includes a housing with a mating face, a ferrule having a plurality of optical fibers, and a beam expanding element generally aligned with each optical fiber. A cover is slidably mounted on the housing adjacent the mating face. One of the housing and the cover includes a retention member. Another of the housing and the cover includes a guide and retention member. The guide and retention member interacts with the retention member to retain the cover to the housing and permit sliding movement of the housing relative to the cover. An assembly of connectors, a method of mating and a tool for mating are also provided.

13 Claims, 18 Drawing Sheets

CONNECTOR WITH INTERFACE PROTECTION

CROSS REFERENCE TO RELATED APPLICATIONS

The Present Disclosure claims priority to prior-filed U.S. Provisional Patent Application No. 61/804,249, entitled "Connector With Interface Protection," filed on 22 Mar. 2013 with the United States Patent And Trademark Office. The content of the aforementioned Patent Application is fully incorporated in its entirety herein.

BACKGROUND OF THE PRESENT DISCLOSURE

The Present Disclosure relates, generally, to connector systems, and, more particularly, to a connector system having a structure for limiting access to the mating face of the connector system during or after mating of the connector system.

Optical and electrical assemblies are often configured to be interconnected as part of a larger system or systems. In some situations, the interface of the assemblies is subject to being damaged or the optical or electrical paths interrupted or degraded by contaminants or debris that may enter the interface during or after the process of mating or bringing the assemblies together. For example, in some applications, the end faces of mating optical fibers physically contact one another to effect signal transmission between the mating optical fiber pair. In such applications, various factors may reduce the efficiency of the light transmission between the optical fiber pair such as irregularities, burrs or scratches in the fiber end faces, misalignment of the fibers as well as dust or debris between the fibers at the mating interface. Removable dust covers are often used to prevent physical damage to the interfaces of the mating optical fibers.

Operating within or under water is another environment that presents challenges for optical fiber interconnect systems. Some systems use complex sealing configurations that attempt to maintain a watertight seal around the optical interface. Such sealing configurations are often expensive and may result in significant signal loss in case of a sealing failure.

Expanded beam optical fiber connectors are often used in dirty and/or high vibration environments. Due to the small optical path, relative to the size of any foreign objects such as dust or debris, almost any foreign objects located within the optical transmission path will interfere with the transmission of light. Expanded beam optical connectors expand the width of the optical beam and transmit the expanded beam over an air gap between mating connectors. By expanding the beam, the relative size difference between any foreign object and the optical path is increased, reducing the impact of any such foreign object on the efficiency of the light transmission.

Aspects of the conventional systems may be improved upon to present a less complicated, more reliable system.

SUMMARY OF THE PRESENT DISCLOSURE

In one aspect, an optical fiber assembly is provided for mating with a mating component along a mated axis. The optical fiber assembly includes a housing with a mating face for mating with the component, a ferrule having a plurality of optical fibers positioned therein, and a beam expanding element generally aligned with each optical fiber. A cover is slidably mounted on the housing adjacent the mating face. One of the housing and the cover includes a retention member. Another of the housing and the cover includes a guide and retention member. The guide and retention member interacts with the retention member to retain the cover to the housing and permit sliding movement of the housing relative to the cover.

In another aspect, an assembly includes a first connector and a second connector. The first connector has a first housing with a first mating face, a ferrule with a plurality of optical fibers positioned therein, and a beam expanding element generally aligned with each optical fiber. The first connector further includes a retention member. The second connector has a second housing with a second mating face, a ferrule with a plurality of optical fibers positioned therein, and a beam expanding element generally aligned with each optical fiber. The second connector further includes a guide and retention member. The guide and retention member interacts with the retention member to retain the first connector to the second connector and permit sliding movement of the first connector relative to the second connector.

In another aspect, a method of mating a pair of connector assemblies includes providing a first connector assembly having a first connector with a first housing including a first mating face, a first cover positioned generally adjacent the first mating face and a first axis. A second connector assembly is provided having a second connector with a second housing including a second mating face, a second cover positioned generally adjacent the second mating face and a second axis. The first and second connector assemblies are positioned in an offset position with the first and second axes being generally parallel and spaced apart. The first connector is positioned laterally adjacent the second cover and the second connector is positioned laterally adjacent the first cover. The first cover is moved relative to the first mating face. The second cover is moved relative to the second mating face. The first connector is moved relative to the second connector to align the first and second axes and position the first and second mating faces generally adjacent each other.

In still another aspect, a tool is provide for mating a first connector to a second connector. The tool includes a first nest configured to receive a first assembly including a first connector and a first cover. A second nest is configured to receive a second assembly including a second connector and a second cover. The second nest is laterally adjacent the first nest. A movable engagement member is configured to extend into the first nest to engage the first connector to slide the first connector relative to the second connector to align the first connector and the second connector along a mated axis.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
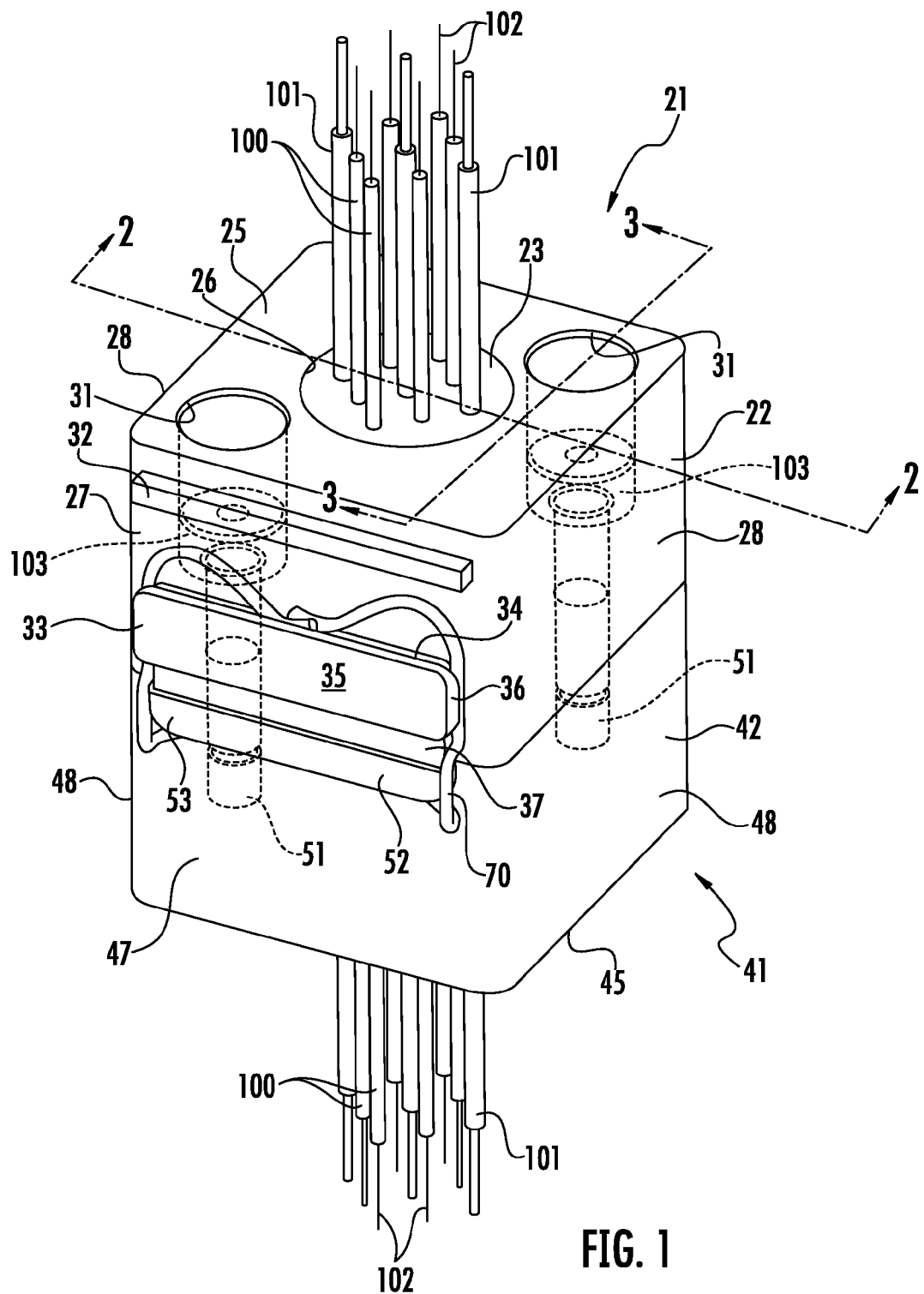
FIG. 1 is a perspective view of a pair of mating connectors in accordance with the Present Disclosure.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to FIGS. 1-4, a first or upper hybrid connector 21 and a mating second or lower hybrid connector 41 are depicted. The upper connector 21 has an upper body or housing 22 with a central interface section 23 for securing and positioning a plurality of optical fibers 100 and electrically conductive wires 101. Each lower connector 41 includes a lower body or housing 42 with a central interface section 43 for securing and positioning a plurality of optical fibers 100 and electrically conductive wires 101. If desired, upper housing 22 and lower housing 42 may be configured to have a shape other than the generally rectangular configuration depicted. In addition, the central interface sections 23 may include only optical fibers 100, only electrically conductive wires 101 or a combination of both and the number of optical fibers and electrically conductive wires may be varied as desired.

Upper housing 22 is generally rectangular and has a generally flat front or mating face 24, a generally flat, oppositely facing rear face 25 and a generally circular cavity 26 therebetween in which the central interface section 23 is positioned. A pair of generally identical and opposite facing sidewalls extend between the front face 24 and the rear face 25. A pair of generally identical and oppositely facing end walls 28 extend between the front face 24 and the rear face 25 and interconnect the sidewalls 27. Upper housing 22 may be formed of a variety of materials including metals or resins. In one embodiment, upper housing 22 may be formed of stainless steel.

A pair of stepped bores 31 are positioned in opposite corners of the upper housing 22 and extend between the front face 24 and the rear face 25. Each stepped bore 31 is configured to receive a shoulder bolt 103 therethrough for securing the upper connector 21 to the lower connector 41.

Figure 3:
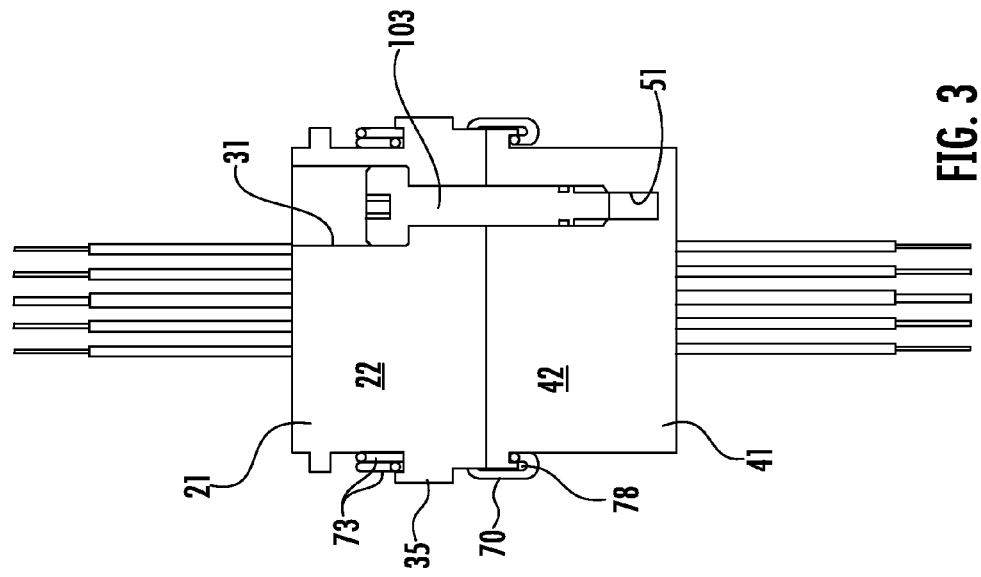
FIG. 3 is a sectional view of the pair of mating connectors taken generally along Line 3-3 of FIG. 1.
Figure 2:
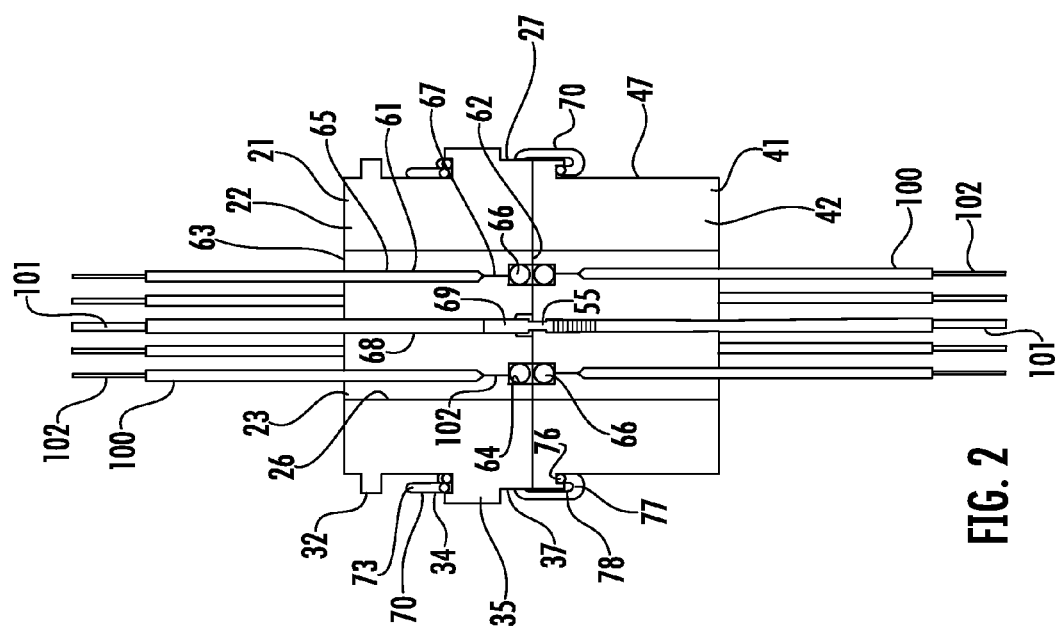
FIG. 2 is a sectional view of the pair of mating connectors taken generally along Line 2-2 of FIG. 1.
Figure 4:
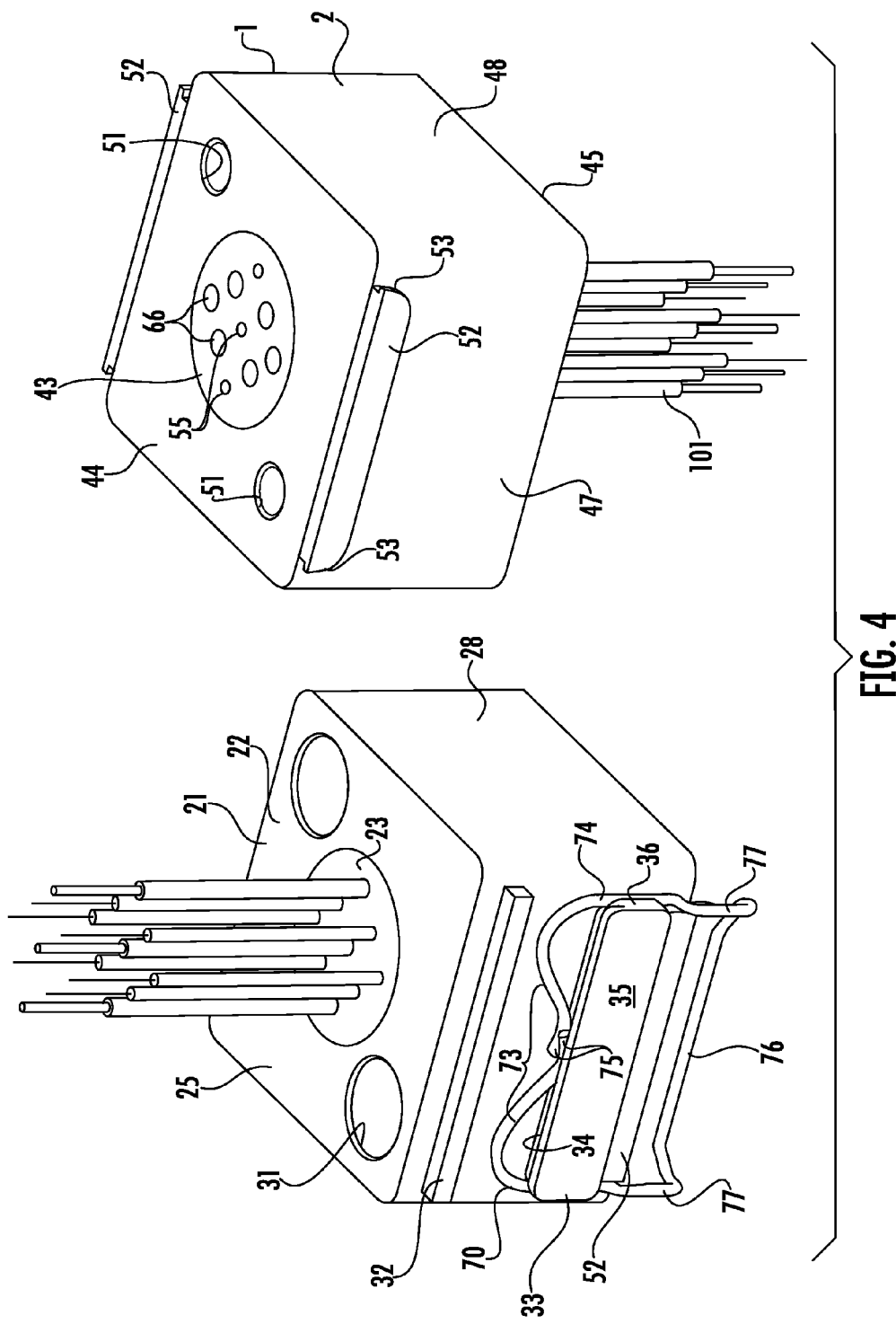
FIG. 4 is a perspective view of the pair of mating connectors of FIG. 1 laterally offset prior to mating.

Each sidewall 27 has a generally rectangular horizontally extending guide projection 32 generally adjacent and extending generally parallel to rear face 25. If desired, guide projection 32 may be formed of a series of generally linearly positioned individual projections rather than as an elongated member. Upper housing 22 also includes a generally rectangular, horizontally extending clip retention section 33 generally adjacent and extending generally parallel to the front face 24. As best seen in FIGS. 2-3, clip retention section 33 has an upper recess 34 between sidewall 27 and the side surface 35 of the clip retention section 33. A pair of end recesses 36 are positioned between the sidewall 27 of the side surface 35 adjacent the ends of the clip retention section 33. A lower stepped section 37 is positioned between a lower surface of the clip retention section 33 and the front face 24 of the upper housing 22. The upper recess 34 and the end recesses 36 are configured to assist in securing retention clip 70 to the upper housing 22.

Central interface section 23 may support a plurality of optical fibers 100 and electrically conductive wires 101. Central interface section 23 may have a sub-housing or ferrule 60 for supporting the optical fibers 100 and the wires 101. The ferrule 60 has a plurality of optical fiber bores 61 extending between its front face 62 and its rear face 63. Each optical fiber bore 61 may have a first relatively large section 61a extending from the rear face 63 towards the front face 62 and configured to receive a portion of the optical fiber cable 100 therein. A second section 61b extends from the first section 61a to the front face 62 and has a substantially smaller diameter than the first section 61a and is configured to receive a length of bare optical fiber 102 therein. The optical fiber cable 100 and the bare optical fiber 102 may be secured within their respective sections of the ferrule 60 by an adhesive such as epoxy.

A lens plate 64 may be positioned adjacent the ferrule 60 as part of central interface section 23. Lens plate 64 is generally cylindrical and has a front face 65 and a generally flat rear face 66. Lens plate 64 includes a plurality of beam expanding elements such as the lens elements indicated schematically at 67. One lens element 67 is aligned with the end face of each optical fiber 100 so as to create a lens array of spaced apart lens elements within the lens plate 64. The rear face 66 of lens plate 64 is positioned adjacent the front face 41 of ferrule 60. Lens plate 64 may be formed of an optical grade resin that is capable of being injection molded and, if desired, may have a refractive index closely matching that of the optical fibers 100. In an example in which the hybrid connectors 21, 41 are to be used in or under water, it may be desirable to form all or a portion of the lens plate 64 of a material with a refractive index closely matching that of water. By utilizing an optical fiber system with lenses, light may be transmitted as an expanded beam so as to minimize the necessity for exact alignment of the mating hybrid connectors 21, 41. In addition, utilizing an expanded beam interface also minimizes the impact of any foreign objects within the optical path.

The lens elements 67 may take a variety of forms. In one example, the lens elements 67 may be graded index lenses or another type of lens configuration that will permit the front face 65 of the lens plate 64 to be generally flat as depicted in FIG. 2. A flat front face 65 may be desirable in some applications so as to provide flexibility in the environment in which the hybrid connectors 21, 41 are used. For example, a convex lens is typically designed or chosen based upon the medium between aligned lenses through which light will travel. As such, convex lenses designed for use in air will not necessarily perform as well if used underwater. When using a flat front face 65, changes in the medium between aligned lens elements 67 will have less of an impact on the light passing through a flat front face 65 of the lens plate 64 as the light will already be collimated as it passes through the medium. In some applications, conventional geometric lenses may be used. However, such conventional lenses may require the lens elements 67 to be configured specifically for the medium between aligned lens elements in order to optimize performance.

The front face 65 of lens plate 64 may be positioned immediately adjacent the mating face 24 of housing 22 so as to minimize the distance between the front faces 65 of aligned lens plates 64 of a mating pair of hybrid connectors 21, 41. As such, the front face 65 of lens plate 64 may be considered a portion of the mating face 23. Minimizing the distance between the front faces 65 and utilizing a lens plate 64 with a flat front face will reduce the likelihood that foreign objects will enter the space between the lens plates 64. Through such a configuration, a "zero volume" assembly may be created that minimizes the volume of the medium between the lens plates 65 but without the need for the complexity of seals that are sometimes used to seal a mating interface.

In one example, hybrid connectors 21, 41 may be configured so that the distance between the front faces 65 of lens plates 64 is approximately 10% or less of the diameter of the expanded beam as it passes through the medium between the lens plates (i.e., the spot size of the expanded beam). As a result, foreign objects larger than 10% of the diameter of the expanded beam will be unable to fit between the lens plates 64 and the aligned lens elements 67. Objects smaller than 10% of the beam diameter may enter the interface between the lens plates 64 but their impact may not be significant due to their relatively small size. In other applications, the distance between the front faces 65 of the lens plates 64 may be larger (e.g., 25% or more) or smaller (e.g., 5-10%) depending upon the desired performance and the level of precision of the mechanical aspects of the hybrid connectors 21, 41. As an example, an expanded beam may have a diameter of between approximately 250-500 microns. It is believed that with an acceptable level of precision of the mechanical components, a gap of approximately 60 microns between the front faces 65 of lens plates 64 may be maintained. In such example, the gap would range between 12% and 24% of the diameter of the expanded beam passing through the medium.

The ferrule 60 may include electrical connection bores 68 in which terminated electrically conductive wires 101 are positioned. More specifically, electrically conductive wires 101 may be terminated to electrically conductive terminals or contacts 69. An end surface of each electrically conductive terminal 69 may be generally positioned along the front face 62 of ferrule 60. Other configurations of electrically conductive terminals may be utilized. For example, if the upper connector 21 and the lower connector 41 are being used underwater or in another environment that will be subjected to significant levels or water or moisture, electrically conductive terminals with waterproof interfaces may be used.

Lower housing 42 of lower connector 41 is generally rectangular and has a generally planar front or mating face 44 and an oppositely facing rear face 45. A generally circular cavity 46 extends between the front face 44 and the rear face 45 for receiving central interface section 43 therein. A pair of generally identical and oppositely facing sidewalls 47 extend between the front face 44 and the rear face 45. A pair of oppositely facing end walls 48 extend between the front face 24 and the rear face 44 and interconnect the sidewalls 47. The front face 44 of lower connector 41 includes a pair of threaded bores 51 in opposite corners thereof. The threaded bores 51 are configured to receive the threaded ends of shoulder bolts 103 therein to connect the upper connector 21 to the lower connector 41.

Each sidewall 47 has a generally elongated generally rectangular guide and retention rail 52 extending along and generally adjacent to front face 44. The guide and retention rail 52 has curved end sections 53 that act as a lead-in to guide or funnel the guide and retention rail 52 into the guide openings 78 in the retention clip 70 as described below. A lower recess 54 (FIG. 5) is configured to receive the straight section 76 of the lower section 72 of the retention clip 70.

Central interface section 43 may be substantially identical to the central interface section 23 of the upper connector 21. Accordingly, the description thereof is not repeated herein and like reference numbers are used to identify like components. One difference between the central interface section 43 of the lower connector 41 and the central interface section 23 of the upper connector 21 is that the electrically conductive terminal 55 of the central interface section 43 is depicted as being resilient or spring-loaded to provide a resilient interface and increase the reliability of the electrical connection between the electrically conductive terminal 69 of the upper connector 21 and the electrically conductive terminal 55 of the lower connector 41.

Upper connector 21 includes a pair of retention clips 70 that interact with guide and retention rails 52 of the lower connector 41 to permit the upper connector 21 and the lower connector 41 to slidingly engage or mate with each other and to secure the two connectors together once mated. Retention clip 70 is configured as a resilient wire-form with an upper section 71 and lower section 72. The upper section 71 is configured to secure the retention clip 70 to the upper housing 22. The lower section 72 is configured to slidingly engage the guide and retention rail 52 of lower connector 41. The upper section 71 is generally "M-shaped" and has a pair of arcuate vertical sections 73 that extend along the sidewall 27 of upper housing 22. A vertical section 74 is captured within end recess 36 between the sidewall 27 and the side surface 35 of clip retention section 33. Each arcuate vertical section 73 has an end section 75 adjacent the end section of the other arcuate vertical section and both end section 75 are captured within upper recess 34 between the sidewall 27 and the side surface 35 of clip retention section 33.

The lower section 72 of retention clip 70 has a generally straight section 76 that is connected to each vertical section 74 of the upper section 71 by a "C-shaped" connecting section 77. The C-shaped connecting sections 77 combined with the straight section 76 to create an entrance or guide opening 78 at each end of retention clip 70. The guide openings 78 are configured to slidingly receive the guide and retention rail 52 of lower connector 41. The retention clip 70 is configured to be vertically resilient or deflectable so that the retention clip 70 may expand or deflect open as the guide and retention rail 52 enters the guide opening 78 of the retention clip. The force provided by the resiliency of the retention clip 70 secures the upper connector 21 as well as secures the upper connector 21 to the lower connector 41.

Figure 6:
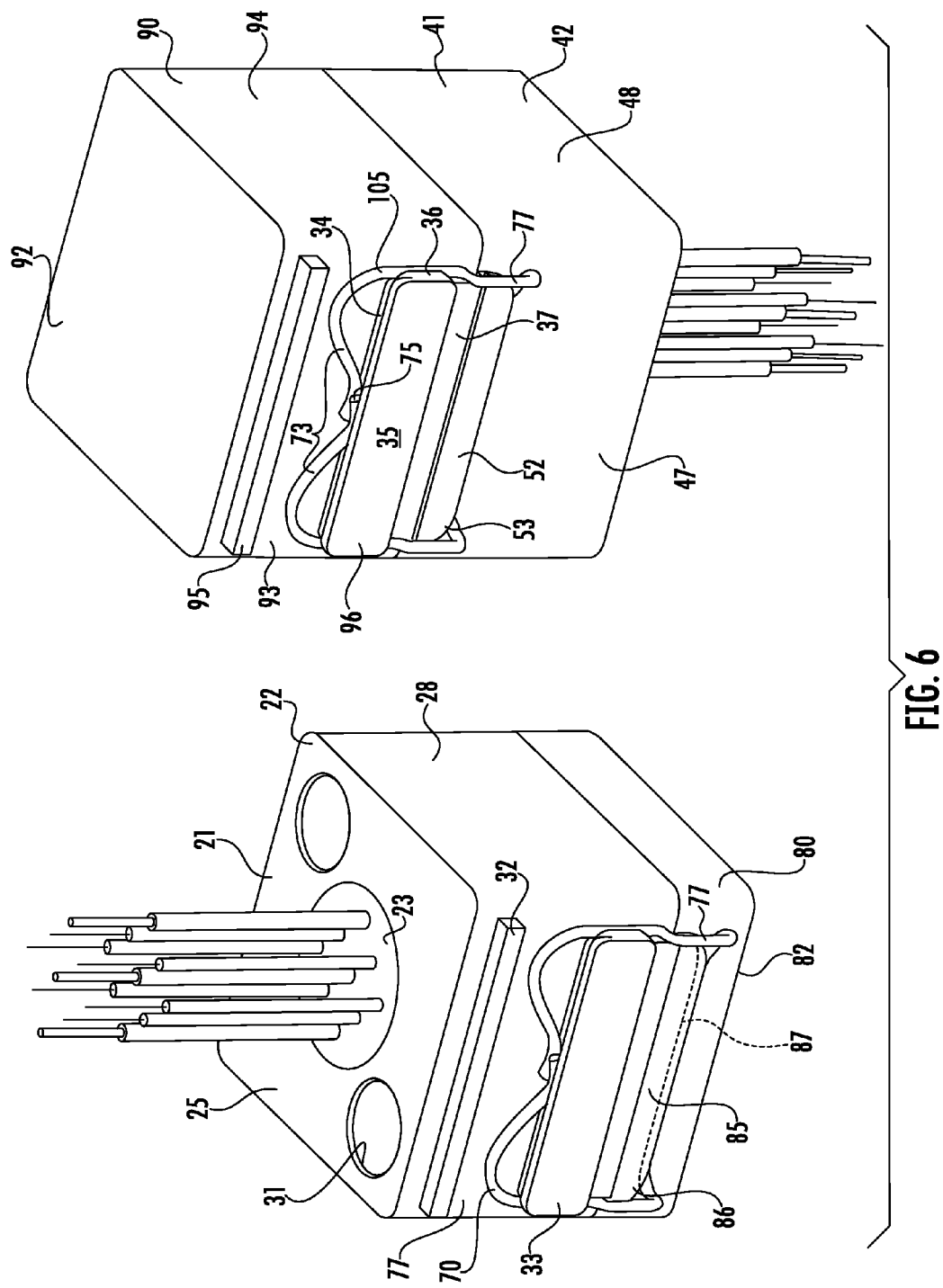
FIG. 6 is a perspective view of the pair of mating connectors of FIG. 4 with an interface protection cover mounted on each connector.
Figure 7:
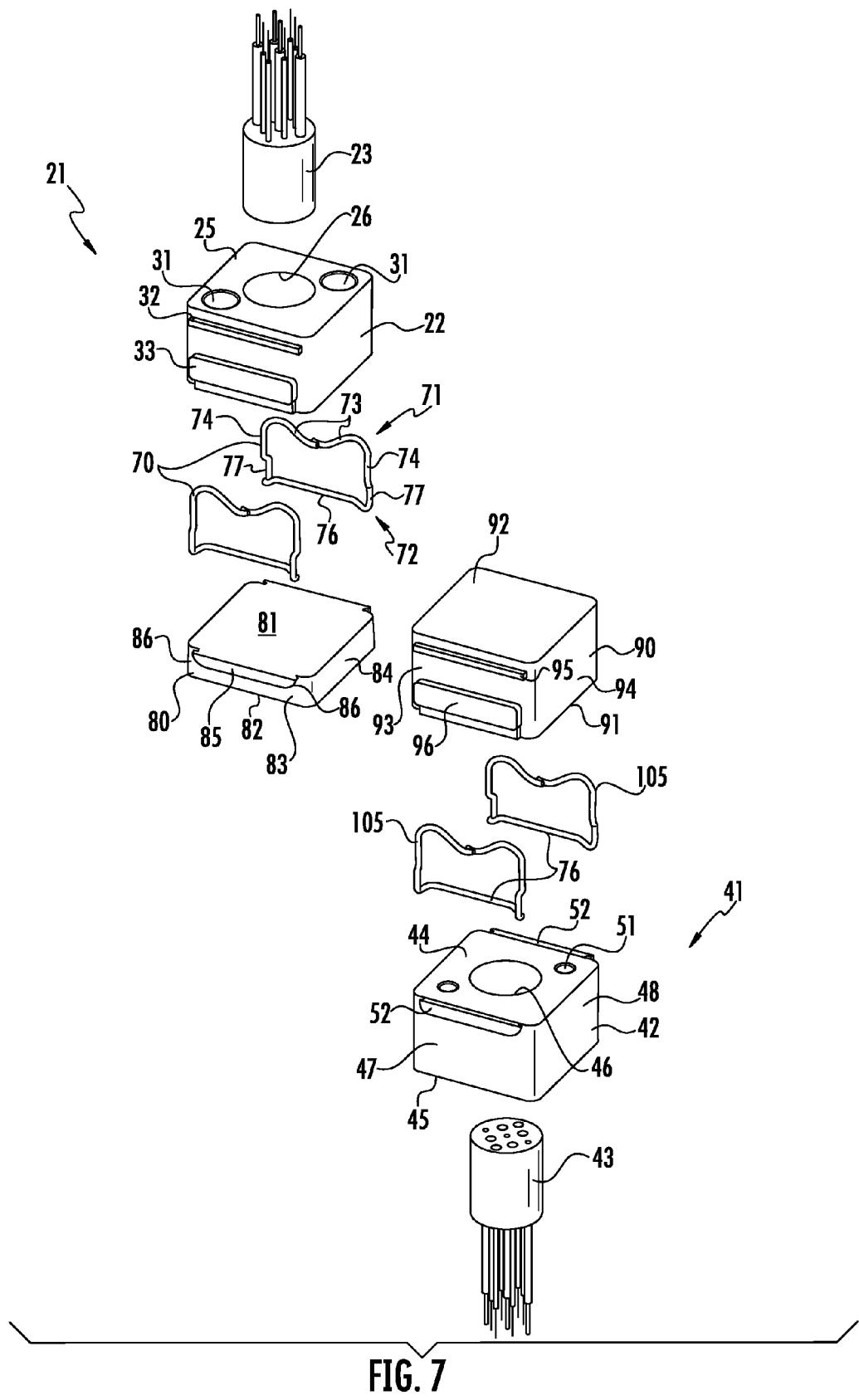
FIG. 7 is an exploded perspective view of the pair of connectors of FIG. 6.

As depicted in FIGS. 6-7, upper connector 21 may include a lower cover 80 laterally slideably mounted thereon. Lower cover 80 is generally rectangular and may be relatively thin or short in the vertical direction relative to the upper connector 21. The lower cover 80 has a front face 81 for positioning adjacent the front face 24 of upper housing 22 and an oppositely facing rear face 82 oriented generally parallel to the front face. The lower cover 80 has a pair of oppositely facing sidewalls 83 that are generally aligned with the sidewalls 27 of upper housing 22 and a pair of oppositely facing end walls 84 that are generally aligned with the end walls 28 of the upper housing. Each sidewall 83 has a generally elongated generally rectangular guide and retention rail 85 extending along and generally adjacent to the front face 81. The guide and retention rails 85 are substantially identical to the guide and retention rails 52 of lower connector 41. More specifically, each guide and retention rail 85 has oppositely facing curved end sections 86 that act as a lead-in to guide or funnel the guide and retention rail 85 into the guide openings 78 in the retention clip 70. A lower recess 87 (FIG. 6) is configured to receive the straight section 76 of the lower section 72 of the retention clip 70.

Lower connector 41 may include an upper cover 90 laterally slideably mounted thereon. Upper cover 90 is generally rectangular and may be approximately the same size as the lower housing 42 of lower connector 41. Upper cover 90 has a front face 91 configured to be positioned adjacent front face 44 of lower connector 41 and an oppositely facing rear face 92 oriented generally parallel to front face 91. Upper cover 90 has oppositely facing sidewalls 93 that are generally aligned with sidewalls 47 of the lower connector 41. End walls 94 face in opposite directions and are generally aligned with the end walls 48 of the lower connector 41.

Each sidewall 93 has a generally rectangular horizontally extending guide projection 95 that is spaced from and is generally parallel to rear face 92. Guide projection 95 of upper cover 90 is substantially identical to guide projection 32 of upper connector 21. Upper cover 90 further includes a clip retention section 96 that is substantially identical to clip retention section 33 of upper connector 21. Like components are identified by like reference numbers and the description thereof is not repeated herein.

Upper cover 90 has a retention clip 105 mounted to the clip retention section 96 on each sidewall 84. Each retention clip 105 is substantially identical to the retention clips 70. Like compounds are identified by like reference numbers and the description thereof is not repeated herein. The retention clips 105 and their interaction with the clip retention sections 96 are substantially identical to the manner in which each retention clip 70 is mounted on its clip retention section 33 of the upper connector 21 and the description thereof is not repeated herein.

By utilizing identical configurations for the retention clips 105 and 70 as well as guide and retention rails 52 and 85, the engagement between the upper connector 21 and the lower connector 41 together with the engagement with their respective covers may be achieved in an identical or similar manner. More specifically, the retention clips 70 facilitate the sliding engagement or mating of the upper connector 21 with the lower connector 41 as well as their subsequent retention. Similarly, the retention clips 70 facilitate the sliding engagement of the upper connector 21 with the lower cover 80 as well as their subsequent retention. The retention clips 105 facilitate the sliding engagement of the lower connector 41 with the upper cover 90 as well as their subsequent retention.

Figure 8:
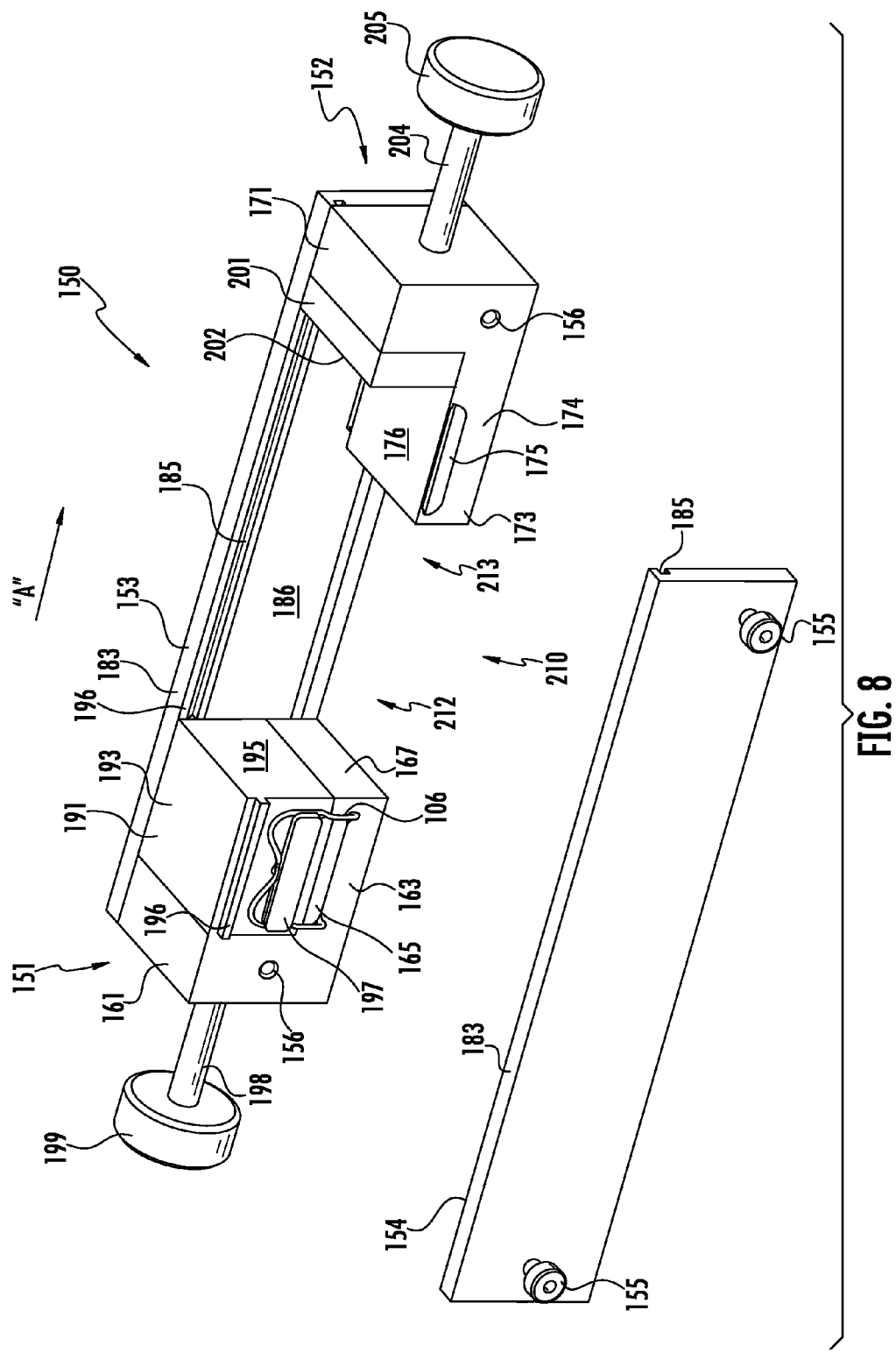
FIG. 8 is a partially exploded perspective view of a tool for mating the pair of connectors of FIG. 3.
Figure 9:
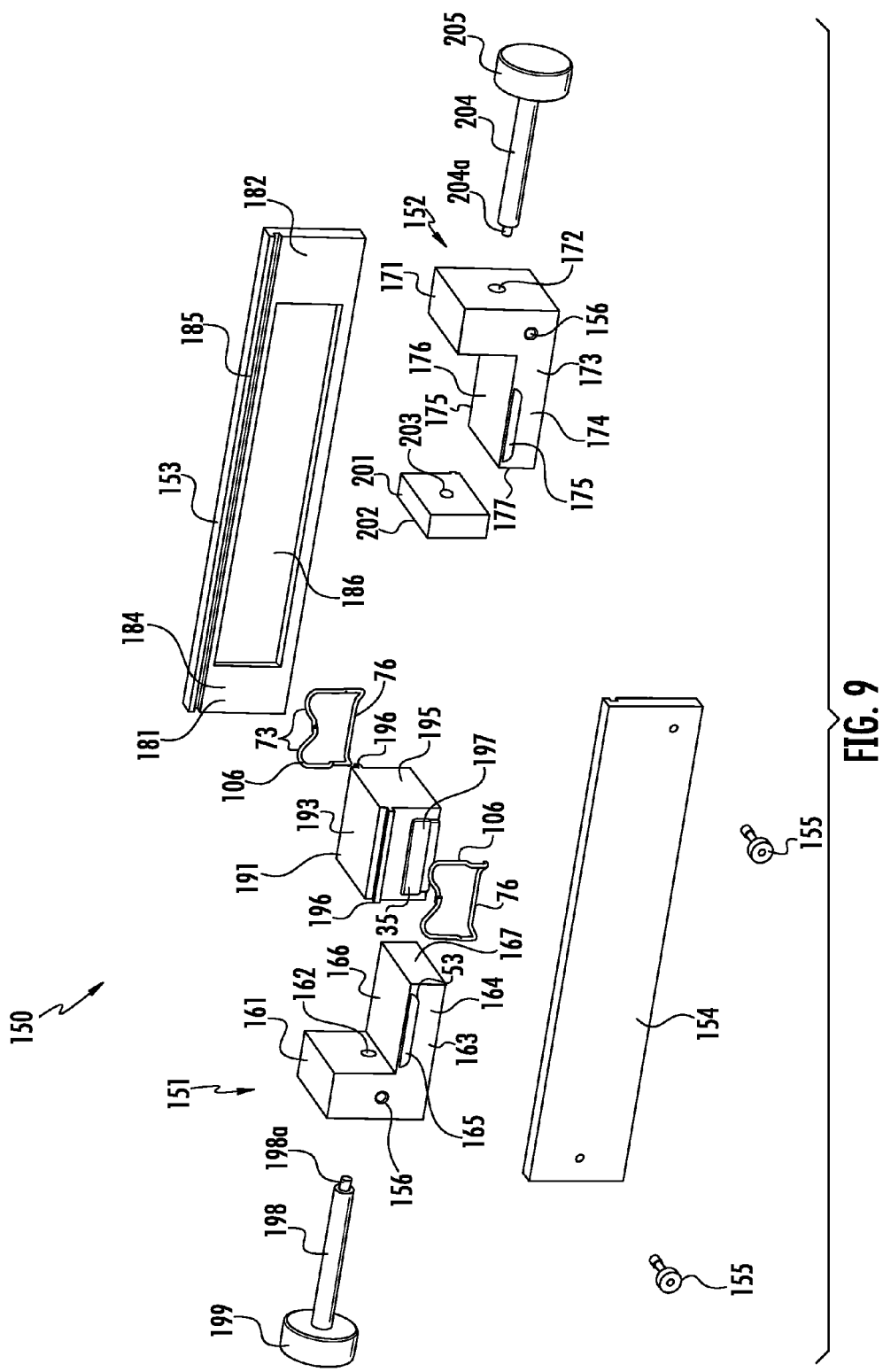
FIG. 9 is an exploded perspective view of the tool of FIG. 8.

FIGS. 8-9 depict a tool or fixture 150 for mating and unmating the upper connector 21 and the lower connector 41. Tool 150 has a mating end support 151 and an opposite unmating end support 152 that are mounted to opposite ends of a fixed sidewall 153. A removable sidewall 154 may be removably connected to the mating end support 151 and the unmating end support 152 through fasteners such as bolts 155 that may be secured to threaded holes or bores 156 in the mating end support 151 and unmating end support 152.

Mating end support 151 is generally L-shaped with a first leg 161 and a second leg 163. The first leg 161 is generally vertical or generally perpendicular to generally linear mating movement of the connectors 21, 41 along a path of travel of upper connector 21 as indicated by arrow "A." First leg 161 has a bore 162. The second leg 163 of the mating end support 151 extends generally horizontally or generally parallel to the path of travel "A" and towards the unmating end support 152. The second leg 163 has oppositely facing side surfaces 164. Each side surface 164 has an elongated, generally rectangular guide and retention rail 165 extending generally parallel to and adjacent upper surface 166 of second leg 163. Each of the guide and retention rails 165 is substantially identical to the guide and retention rails 85 of the lower cover 80 and the description thereof is not repeated herein. Like reference numbers are used to identify like components.

Unmating end support 152 is generally L-shaped with a first leg 171 and a second leg 173. The first leg 171 extends vertically or generally perpendicular to the path of travel "A" of the upper connector 21. A bore 172 extends through the first leg 171. The second leg 173 extends generally horizontally or generally parallel to the path "A" and towards mating end support 151. The second leg 173 has side surfaces 174 with an elongated generally rectangular guide and retention rail 175 extending generally parallel to and along upper surface 176 of the second leg 173. The guide and retention rails 175 are substantially identical to the guide and retention rails 85 of the lower cover 80 and the description thereof is not repeated. Like reference numbers are used to identify like components thereof. Mating end support 151 and unmating end support 152 may be similarly configured and, as depicted, the second leg 173 of the unmating end support 152 may be longer than the second leg 163 of the mating end support 151.

Figure 14:
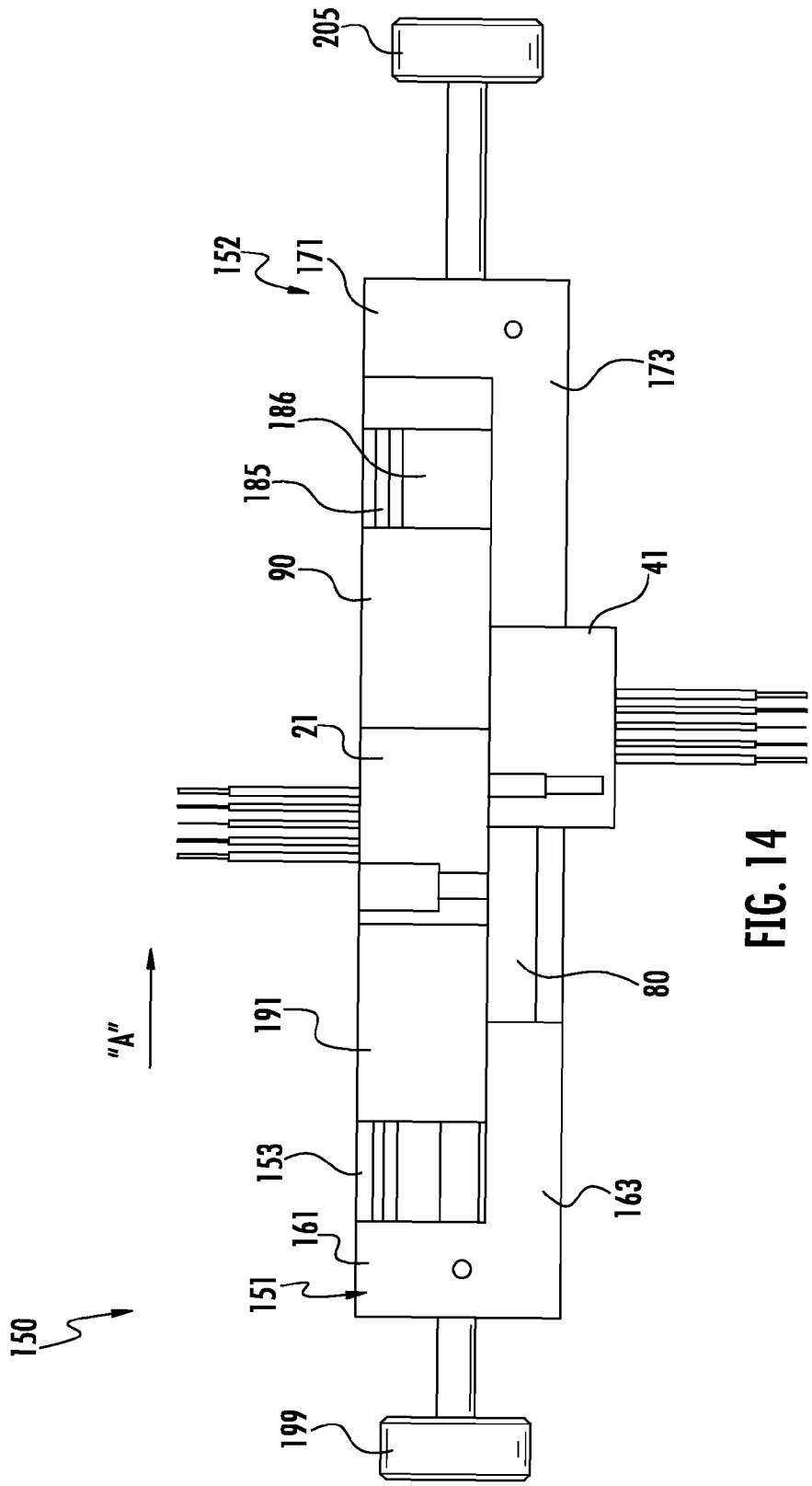
FIG. 14 is a perspective view of a section taken generally along Line 14-14 of FIG. 13.
Figure 15:
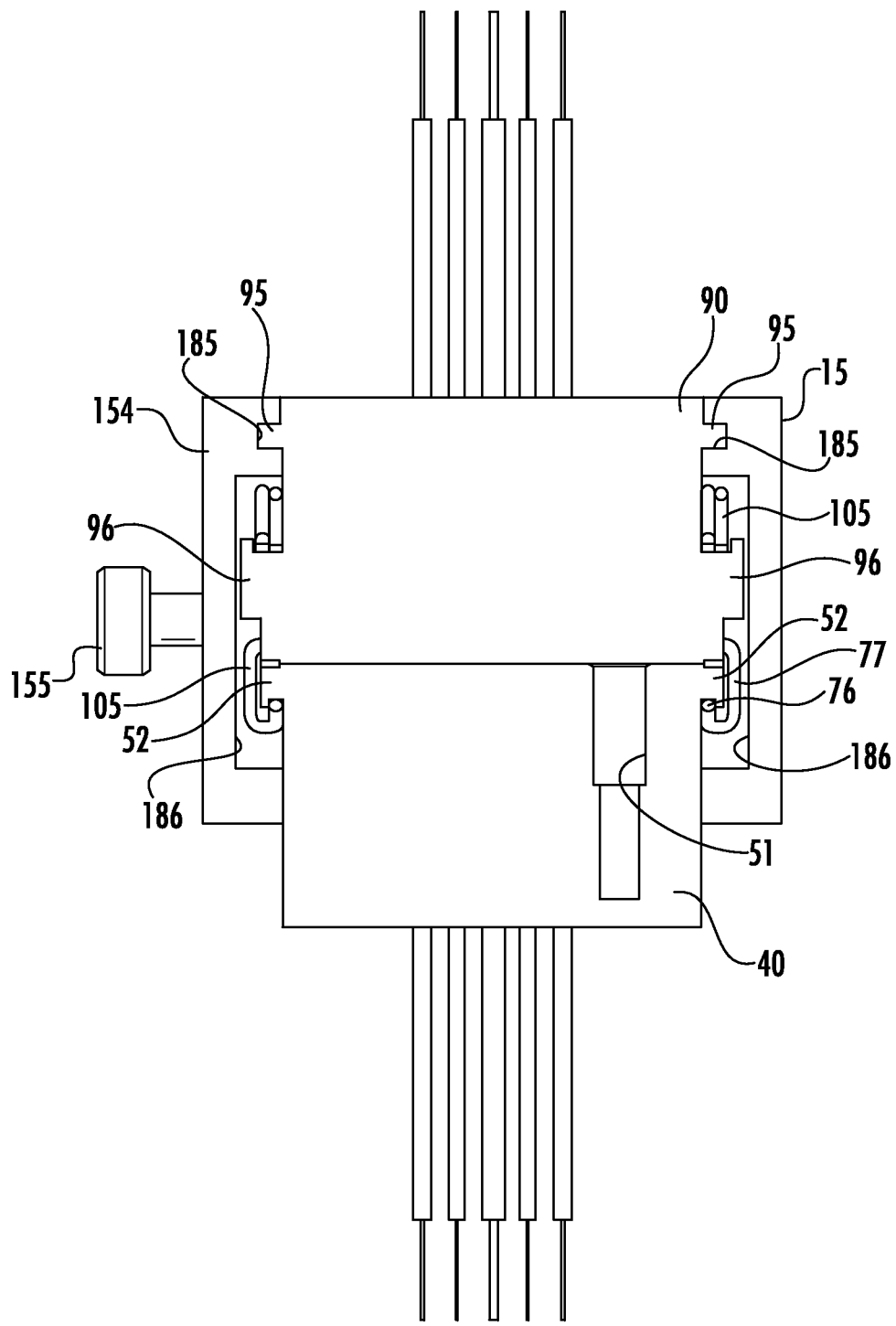
FIG. 15 is a section through the tool and one of the connectors taken generally along Line 15-15 of FIG. 13.

The fixed sidewall 153 is a generally elongated rectangular member with a first end 181 and a second opposite end 182. The fixed sidewall 153 further includes an upper surface 183 and an inner face 184. A guide channel 185 extends along the inner face 184 generally adjacent and generally parallel to upper surface 183. The guide channel 185 is dimensioned so as to slidingly receive the guide projection 32 of upper connector 21 and the guide projection 95 of the upper cover 90 so as to capture the guide projections therein and permit the upper connector 21 and upper cover 90 to slide along the fixed sidewall 153 (FIG. 14). The inner face 184 further includes a recess or clearance 186. The recess 186 is configured so as to allow the clip retention section, guide and retention rail and retention clip of the various components to slide along the fixed sidewall 153. The mating end support 151 may be secured to the first end 181 of fixed sidewall 153 and the unmating end support 152 may be secured to the second end 182 of the fixed sidewall 153 in a variety of manners including fasteners such as bolts (not shown).

Removable sidewall 154 is substantially identical to fixed sidewall 153 except that it is removably secured to the mating end support 151 and the unmating end support 152 through fastener such as bolts 155. Once removable sidewall 154 is secured to the mating end support 151 and the unmating end support 152, the oppositely facing guide channels 185 of the fixed sidewall 153 and the removable sidewall 154 create a track along which each component having a guide projection may slide as described in more detail below.

When assembled, mating end support 151, unmating end support 152, fixed sidewall 153 and removable sidewall 154 define a mating nest 210 for receiving upper connector 21 and lower connector 41. More specifically, the mating nest 210 includes a first or upper connector receiving bay 212 between the fixed sidewall 153 and the removable sidewall 154 and generally adjacent the second leg 163 of the mating end support 151. A second or lower connector receiving bay 213 is located between the fixed sidewall 153 and the removable sidewall 154 and between the lower connector receiving bay and the second leg 173 of the unmating end support 152.

Mating end support 151 has a large push block 191 slidably mounted thereon. Large push block 191 may be configured in a manner similar to upper cover 90. More specifically, large push block 191 is generally rectangular and has a lower face 192 and an oppositely facing upper face 193. A pair of oppositely facing sidewalls 194 extend between the lower face 192 and the upper face 193. Oppositely facing end walls 195 extend between the lower face 192 and the upper face 193 and connect the sidewalls 194. The end walls 195 are generally dimensioned to correspond in size to the end walls 28 of upper connector 21 although they may have other configurations and sizes. Each of the sidewalls 194 has an elongated generally rectangular guide projection 196 that is generally identical to the guide projections 32 of upper connector 21 and the guide projections 95 of upper cover 90. Each sidewall 194 further includes a clip retention section 197 for securing a retention clip 106 to the large push block 191. The clip retention sections 197 are substantially identical to the clip retention sections 33 of the upper connector 21 and the clip retention sections 96 of the upper cover 90 and the description thereof is not repeated herein. Like reference numbers are used to describe like features thereof.

Figure 16:
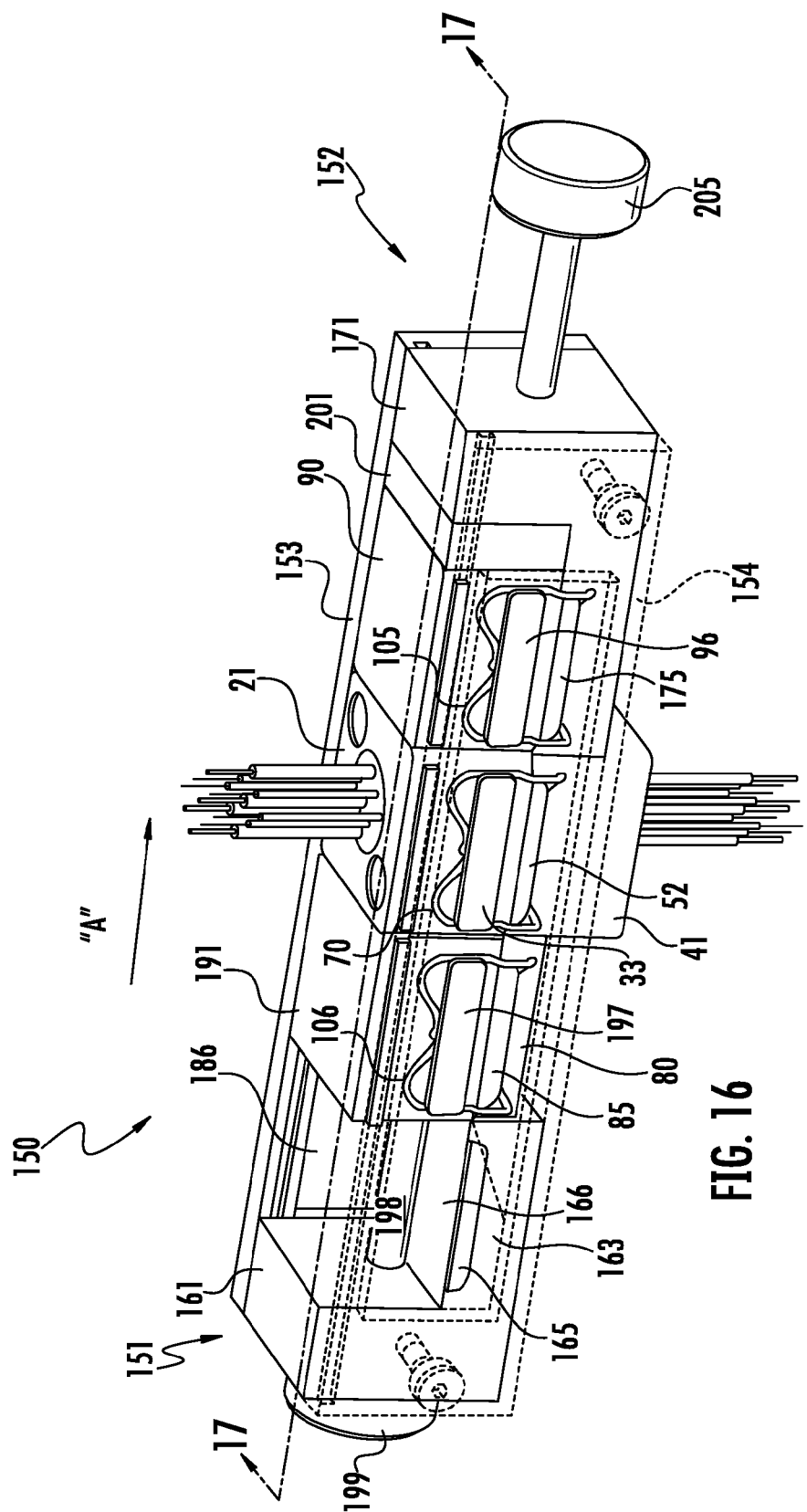
FIG. 16 is a perspective view of the tool and mating connectors in a fully aligned position and with a sidewall of the tool depicted in phantom for clarity.
Figure 17:
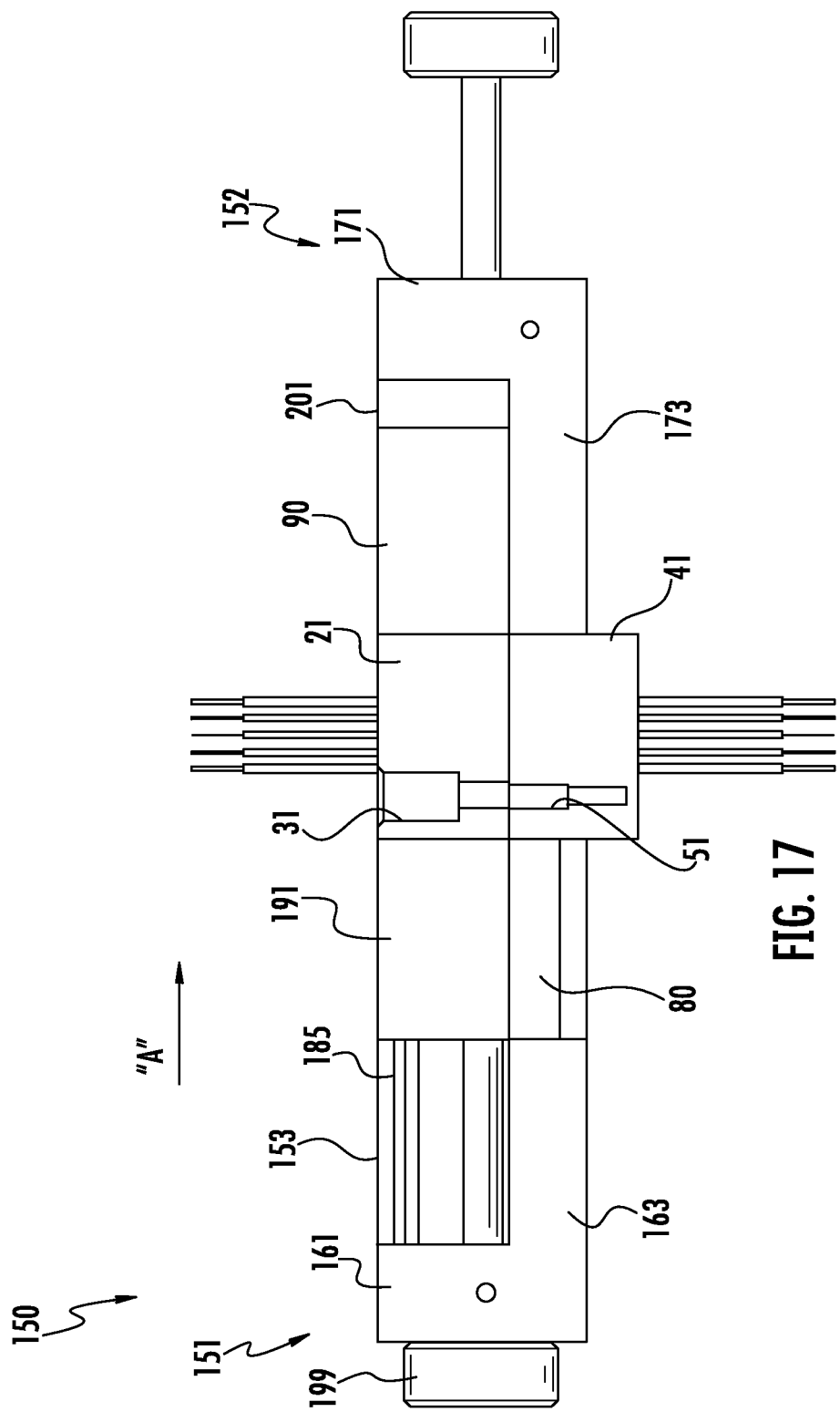
FIG. 17 is a perspective view of a section taken generally along Line 17-17 of FIG. 16.

A shaft 198 with a handle 199 extends through bore 162 in first leg 161 and is secured to large push block 191 such as by threads 198a on the end of shaft 198 that engage a similarly configured bore (not shown) in the end wall 195 of large push block 191 closest to first leg 161 of mating end support 151. Through such a configuration, large push block 191 may slide between a first position at which the large push block 191 is adjacent the upper surface 166 of the second leg 163 of the mating end support 151 (FIG. 8) and a second position at which the large push block 191 has been moved generally along the path of travel "A" so that upper surface 166 second leg 163 and lower face 192 of large push block 191 are generally parallel but laterally spaced apart (as depicted in FIGS. 16-8).

Unmating end support 152 includes a small push block 201 that is slidably mounted on upper surface 176 of the second leg 173. The small push block 201 is generally rectangular with oppositely facing end walls 202. The end walls 202 are generally dimensioned to correspond in size to the end walls 94 of upper cover 90 although they may have other configurations and sizes. The end wall 202 facing the first leg 171 of unmating end support 152 may have a threaded hole 203 therein for receiving a threaded end 204a of shaft 204. A handle 205 may be secured to an opposite end of shaft 204 to facilitate movement of the small push block 201. Shaft 204 may be configured to slide within bore 172 of first leg 171 of unmating end support 152. If desired, small push block 201 may have guide projections (not shown) that slide within the guide channels 185 of the fixed sidewall 153 and the removable sidewall 154.

Figure 10:
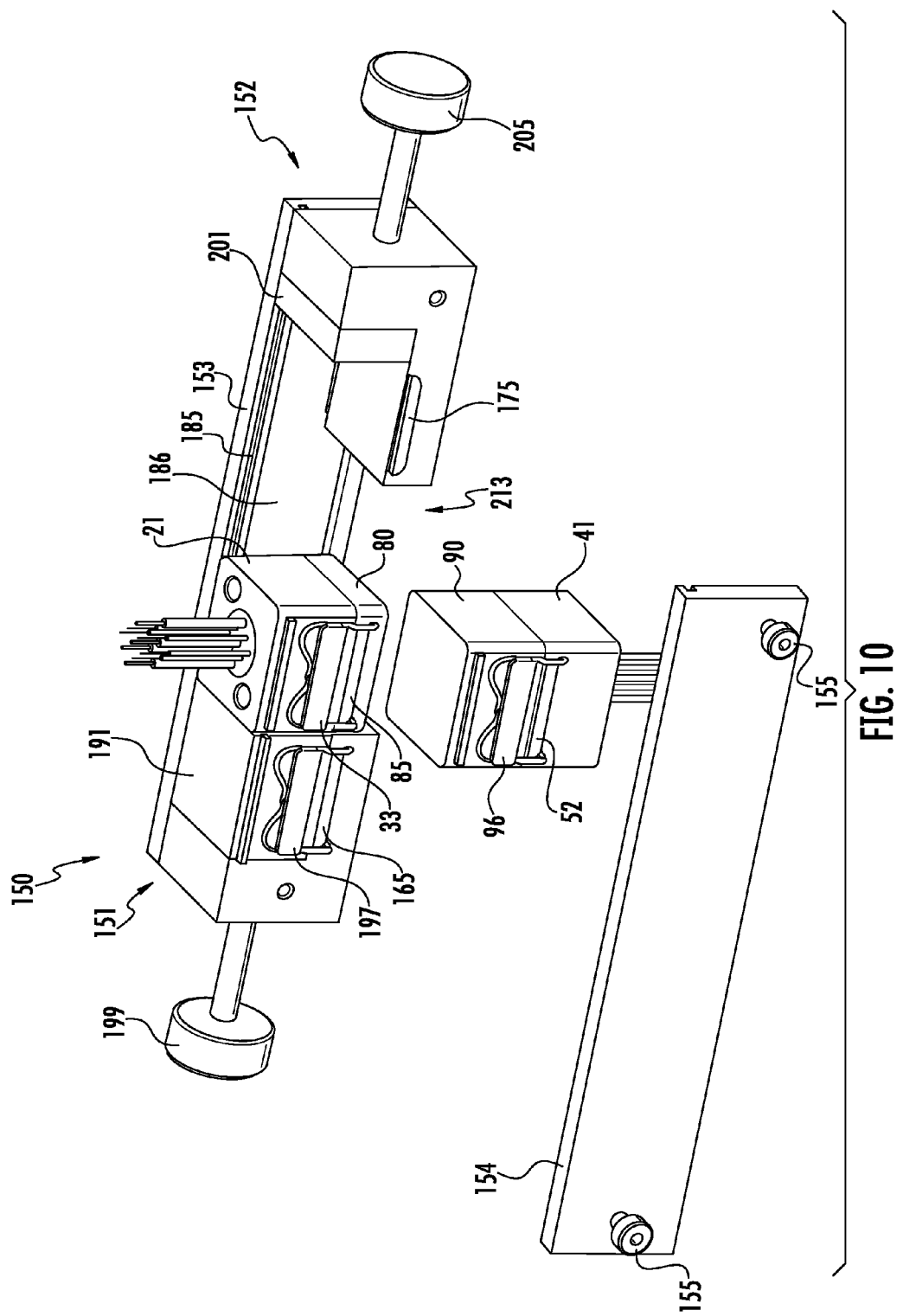
FIG. 10 is a perspective view of the tool of FIG. 8 with a first connector loaded therein, a second connector aligned to be loaded and a sidewall of the tool removed for loading.

In operation, the tool 150 is initially positioned as depicted in FIG. 8 with the large push block 191 aligned with the second leg 163 of the mating end support 151 so that the upper surface 166 of the second leg 163 is adjacent the lower face 192 of large push block 191. The small push block 201 may be positioned adjacent the first leg 171 of unmating end support 152, if desired. An upper connector 21 having a lower cover 80 mounted thereon is oriented in a loading position such that the end walls 28 are aligned along the path of travel "A" as depicted in FIG. 10. The upper connector 21 and lower cover 80 are then positioned within the upper connector receiving bay 212 with a sidewall 27 of the upper connector 21 adjacent the inner face of the fixed sidewall 153 and with the guide projection 32 of the upper connector 21 positioned within the guide channel 185 of the fixed sidewall. The clip retention section 33 of the upper connector 21, the guide and retention rail 85 of the lower cover 80 and the retention clip 70 are positioned within recess 186 of fixed sidewall 153. The end wall 28 facing the mating end support 151 is positioned adjacent the end wall 195 of the large push block 191.

A lower connector 41 having an upper cover 90 mounted thereon is oriented in a loading position such that the end walls 48 are aligned along the direction of travel "A." The lower connector 41 and upper cover 90 are positioned within lower connector receiving bay 213 with a sidewall 47 of the lower connector 41 adjacent the inner face of the thick sidewall 153 and with the guide projection 95 of the upper cover 90 positioned within the guide channel 185 of the fixed sidewall. The guide and retention rail 52 of the lower connector 41, the clip retention section 96 of the upper connector 21, and the retention clip 105 are positioned within recess 186 of fixed sidewall 153. The end wall 48 of the lower connector 41 facing the mating end support 151 is positioned adjacent the end wall 28 of the upper connector 21 and the end wall 84 of the lower cover 80. In doing so, the opposite end wall 48 of the lower connector 41 facing the unmating end support 152 will be adjacent the end wall 177 of the second leg 173 of the unmating end support 152.

The removable sidewall 154 is then mounted on the mating end support 151 and the unmating end support 152 such that the guide channel 185 receives therein the guide projection 32 of the upper connector 21 and the guide projection 95 of the upper cover 90. In such a configuration, the clip retention sections, the guide and retention rails and the retention clips of the upper connector 21 and the lower cover 80, lower connector 41 and upper cover 90, large push block 191, mating end support 151, and unmating end support 152 are all generally aligned along a path generally parallel to the path of travel "A" (FIG. 11) and such components positioned within the space between the recesses 186 between the fixed sidewall 153 and the removable sidewall 154 as best seen in FIG. 14.

Figure 5:
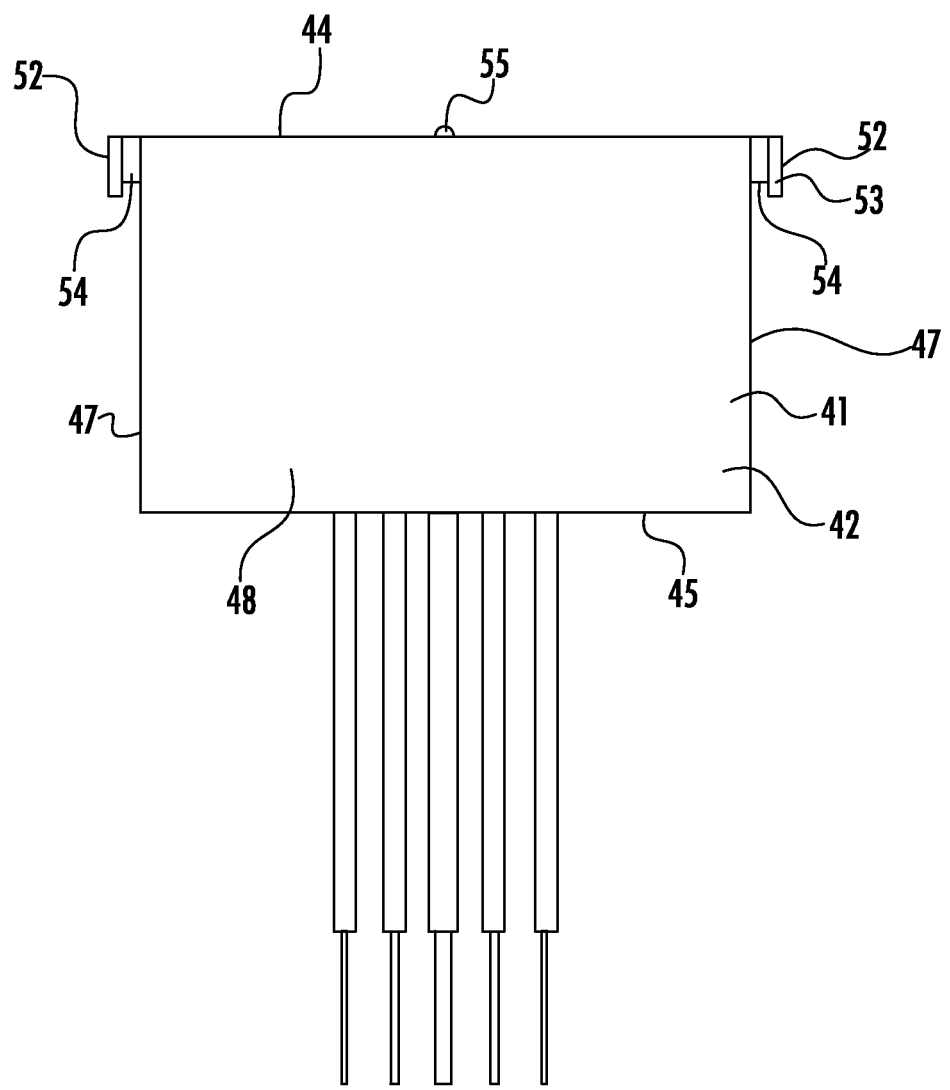
FIG. 5 is an end view of the lower connector of FIG. 4.
Figure 13:
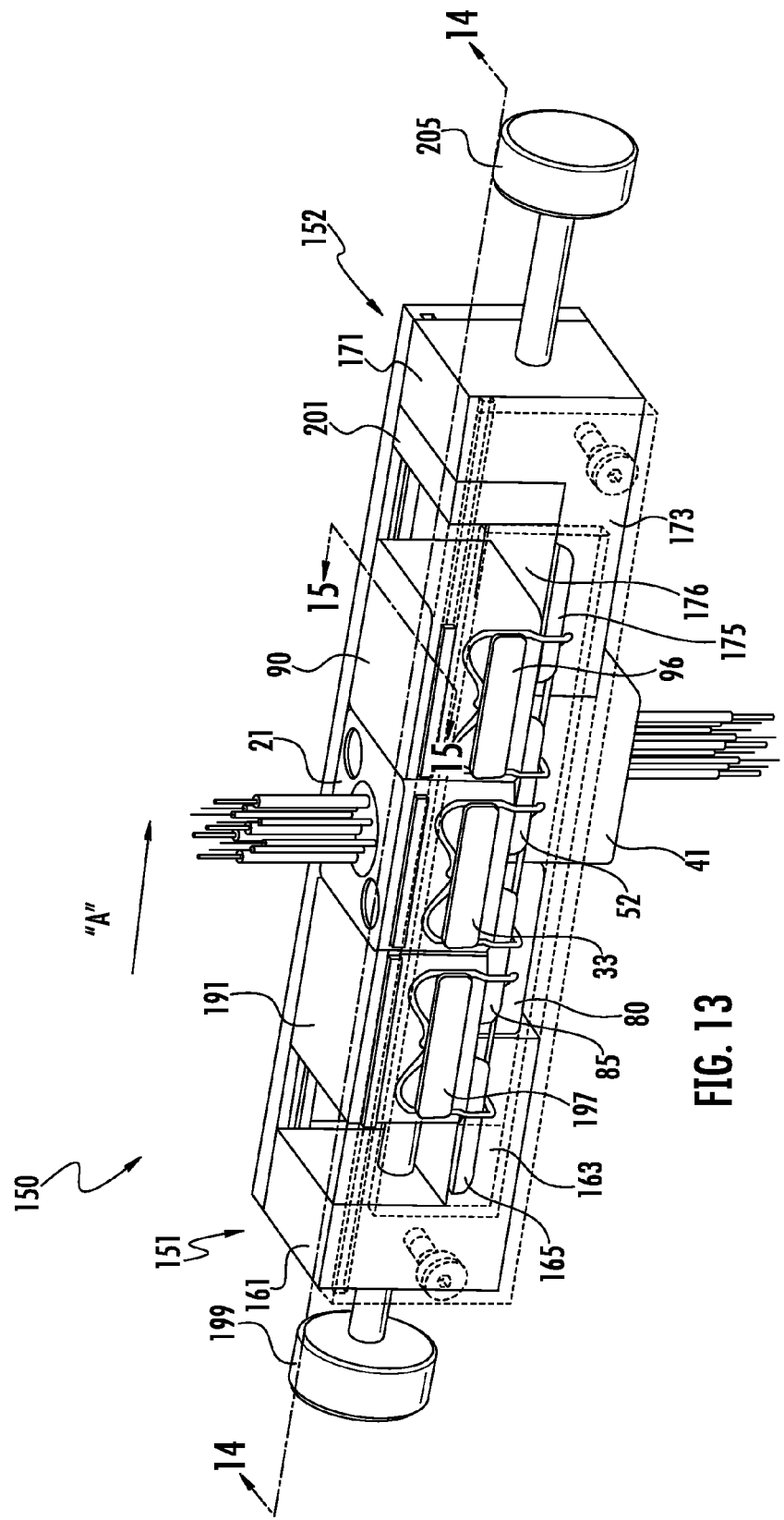
FIG. 13 is a perspective view of the tool and a pair of connectors in a partially mated position and with a sidewall depicted in phantom for clarity.

Referring to FIGS. 13-5, large push block 191 has been moved generally along path of travel "A" by moving handle 199. It may seen that large push block 191 is only partially supported by upper surface 166 of second leg 163 of mating end support 151. Engagement of the end wall 195 of large push block 191 with the end wall 28 of upper connector 21 facing the large push block 191 forces the upper connector 21 to slide along the lower cover 80. The end wall 28 of the upper connector 21 facing the unmating end support 152 engages the end wall 94 of the upper cover 90 facing the mating end support 151. The sliding movement of the upper connector 21 forces the upper cover 90 to slide off of the lower connector 41 towards unmating end support 152 and partially onto the upper surface 176 of the second leg 173 of the unmating end support. As such, it may be seen that the lower cover 80 and the lower connector 41 remain in place between the end wall 167 of the second leg 163 of the mating end support 151 and the end wall 177 of the second leg 173 of the unmating end support 152.

Figure 11:
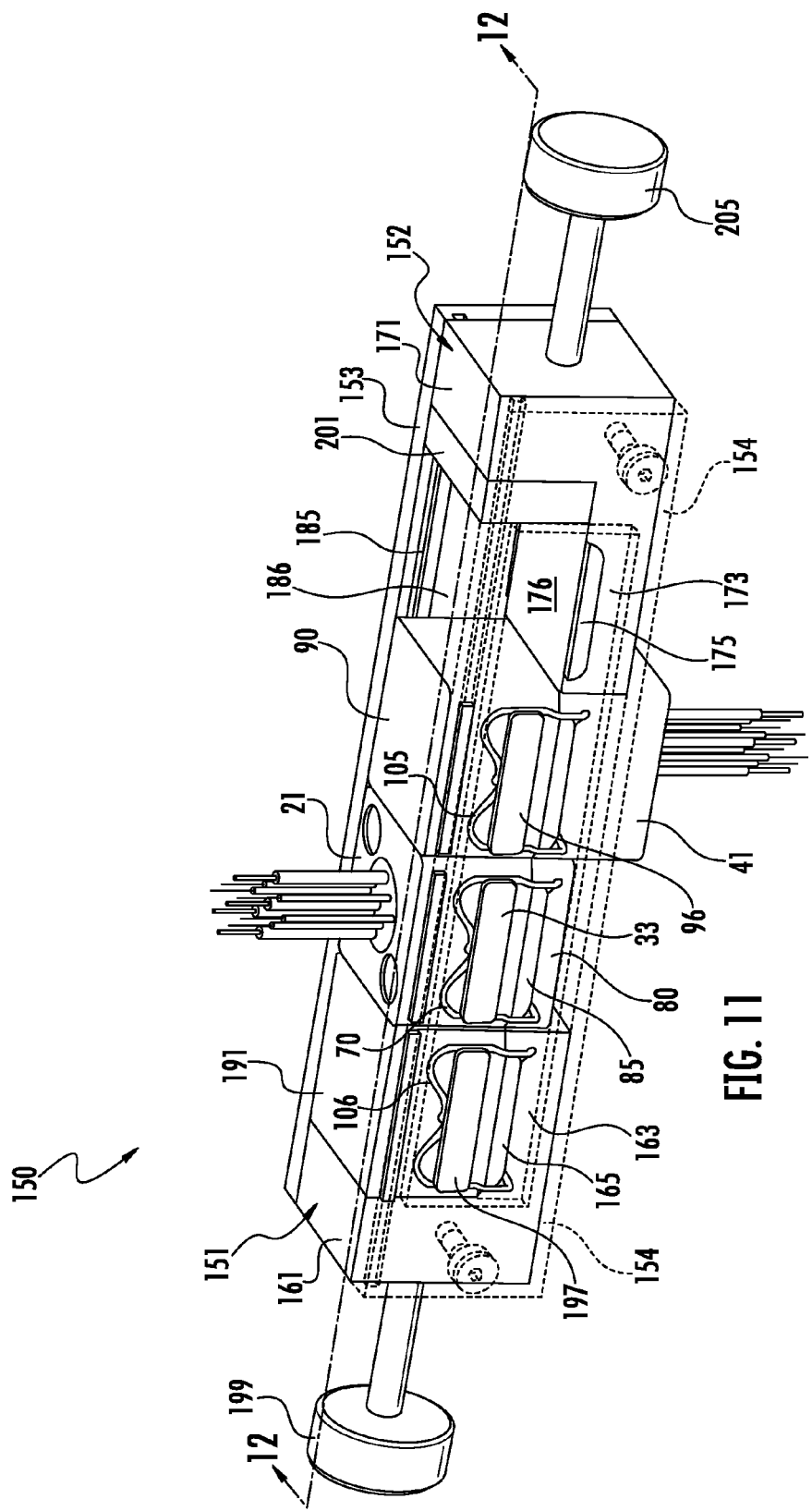
FIG. 11 is a perspective view of the tool of FIG. 8 with the pair of connectors loaded therein prior to mating and with a sidewall depicted in phantom for clarity.
Figure 12:
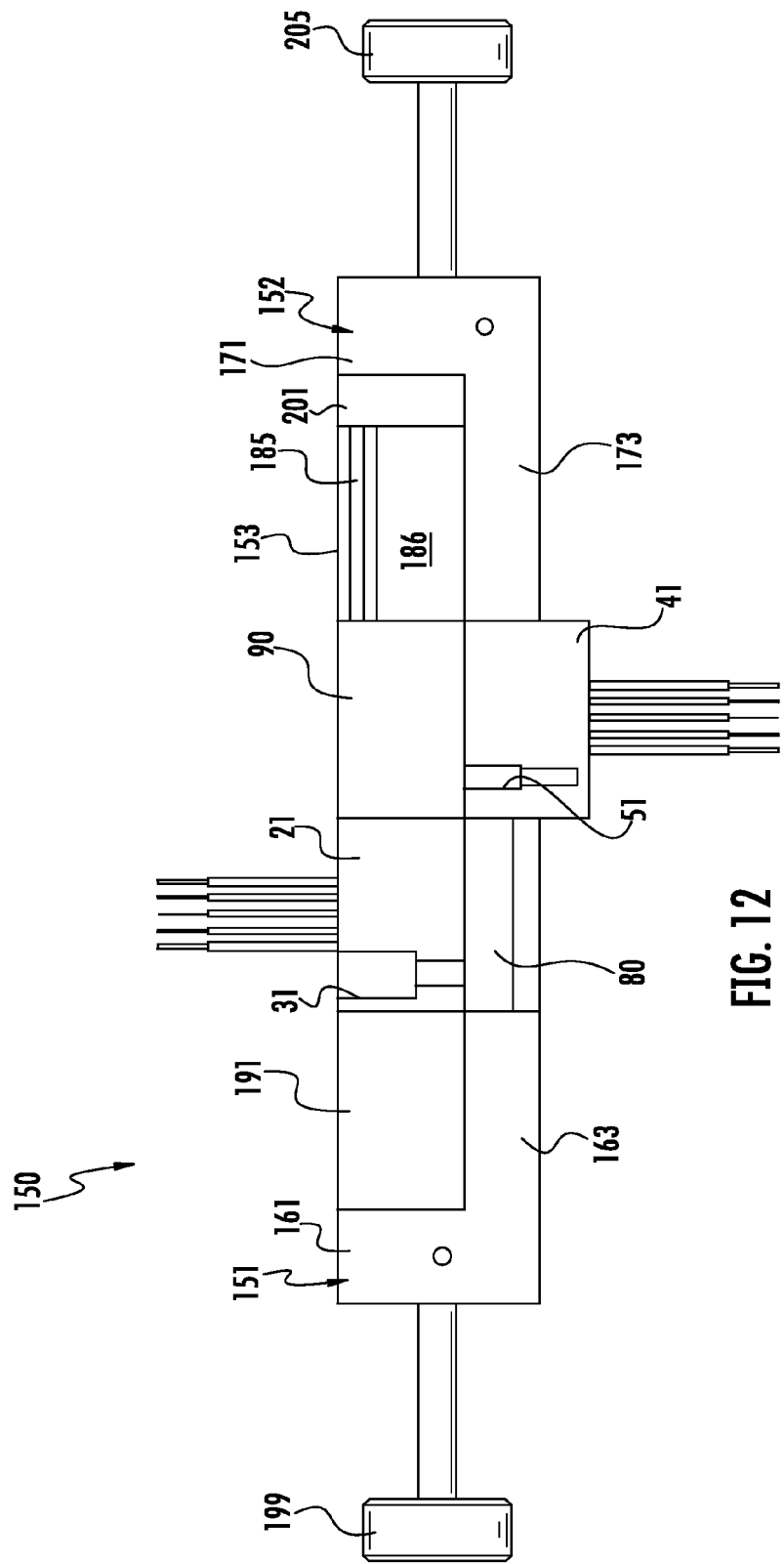
FIG. 12 is a perspective view of a section taken generally along Line 12-12 of FIG. 11.

The combination of the large push block 191, the upper connector 21, and the upper cover 90 move together towards the first leg 171 of the unmating end support 152. As the large push block 191, the upper connector 21 and the upper cover 90 slide from their loading position as depicted in FIG. 11, the guide projection 32 of the upper connector, the guide projection 95 of the upper cover and the guide projection 196 of the large push block slide along guide channel 185.

In addition, the retention clip 70 of the upper connector 21 begins to slide from the guide and retention rail 85 of the lower cover 80 and onto the guide and retention rail 52 of the lower connector 41. At the same time, the retention clip 105 of the upper cover 90 begins to slide from the guide and retention rail 52 of the lower connector 41 onto the guide and retention rail 175 of the unmating end support 152. Similarly, the retention clip 106 of the large push block 191 begins to slide from the guide and retention rail 165 of the mating end support 151 and on to the guide and retention rail 85 of the lower cover 80. As such, the retention clip 70 of the upper connector 21 is simultaneously engaging the guide and retention rail 85 of the lower cover 80 and the guide and retention rail 52 of the lower connector 21. The retention clip 105 of the upper cover 90 simultaneously engages the guide and retention rail 52 of the lower connector 41 and the guide and retention rail 175 of the unmating end support 152. The retention clip 106 of the large push block 191 simultaneously engages the guide and retention rail 165 of the mating end support 151 and the guide and retention rail 85 of the lower cover 80.

Additional movement of the shaft 198 and handle 199 of mating end support 151 moves the large push block 191 further along the path of travel "A" to fully mate the upper connector 21 and the lower connector 41. Such movement of the large push block 191 continues to force the upper connector 21 and the upper cover 90 along the fixed sidewall 153 and the removable sidewall 154. The guide projections 92 of the upper connector 21, the guide projections 95 of the upper cover 90 and the guide projections 196 of the large push block 191 slide within the guide channels 185 of the fixed sidewall 153 and the removable sidewall 154. The upper connector 21 becomes vertically or laterally aligned with the lower connector 41, the upper cover 90 becomes laterally aligned with the second leg 173 of the unmating end support 152 and the large push block 191 becomes laterally aligned with the lower cover 80. As such, the retention clip 70 of the upper connector 21 slides off of the guide and retention rail 85 of the lower cover 80 and onto the guide and retention rail 52 of the lower connector 41. The retention clip 105 of the upper cover 90 slides off of the guide and retention rail 52 of the lower connector 41 and onto the guide and retention rail 175 of the unmating end support 152. The retention clip 106 fixed to the large push block 191 slides from the guide and retention rail 165 of the mating end support 151 and onto the guide and retention rail 85 of the lower cover 80.

Through such a configuration, the upper connector 21 and the lower connector 41 are retained in a direction generally parallel to the axes of the optical fibers 100 and the electrically conductive wires 101. Shoulder bolts 103 may then be inserted through the stepped bores 31 in the upper connector 21 and into the threaded bores 51 in the lower connector 41 to secure the upper connector 21 and the lower connector 41 in their mated configuration as depicted in FIG. 1. The lower cover 80 is secured to the large push block 191 and the upper cover 90 is secured to the second leg 173 of the unmating end support 152.

The removable sidewall 154 may be removed from the mating end support 151 and the unmating end support 152 and the mated pair of the upper connector 21 and the lower connector 41 may be removed from the tool 150. The upper cover 80 may be removed from the large push block 191 by laterally sliding the lower cover 80 off of the large push block or by retracting (i.e., moving to the left as viewed in the figures) the shaft 198 and handle 199 to move the large push block back to its original position aligned with the upper surface 166 of the second leg 163 of the mating end support 151. The upper cover 90 may be removed from the unmating end support 152 by sliding the upper cover laterally off of the upper surface 176 or by applying a force to the handle 205 to move the shaft 204 and thus the small push block 201 along the upper surface 176. In the alternative, the lower cover 80 and the upper cover 90 may remain on the tool 150 until it is desired to unmate the upper connector 21 from the lower connector 41.

Figure 18:
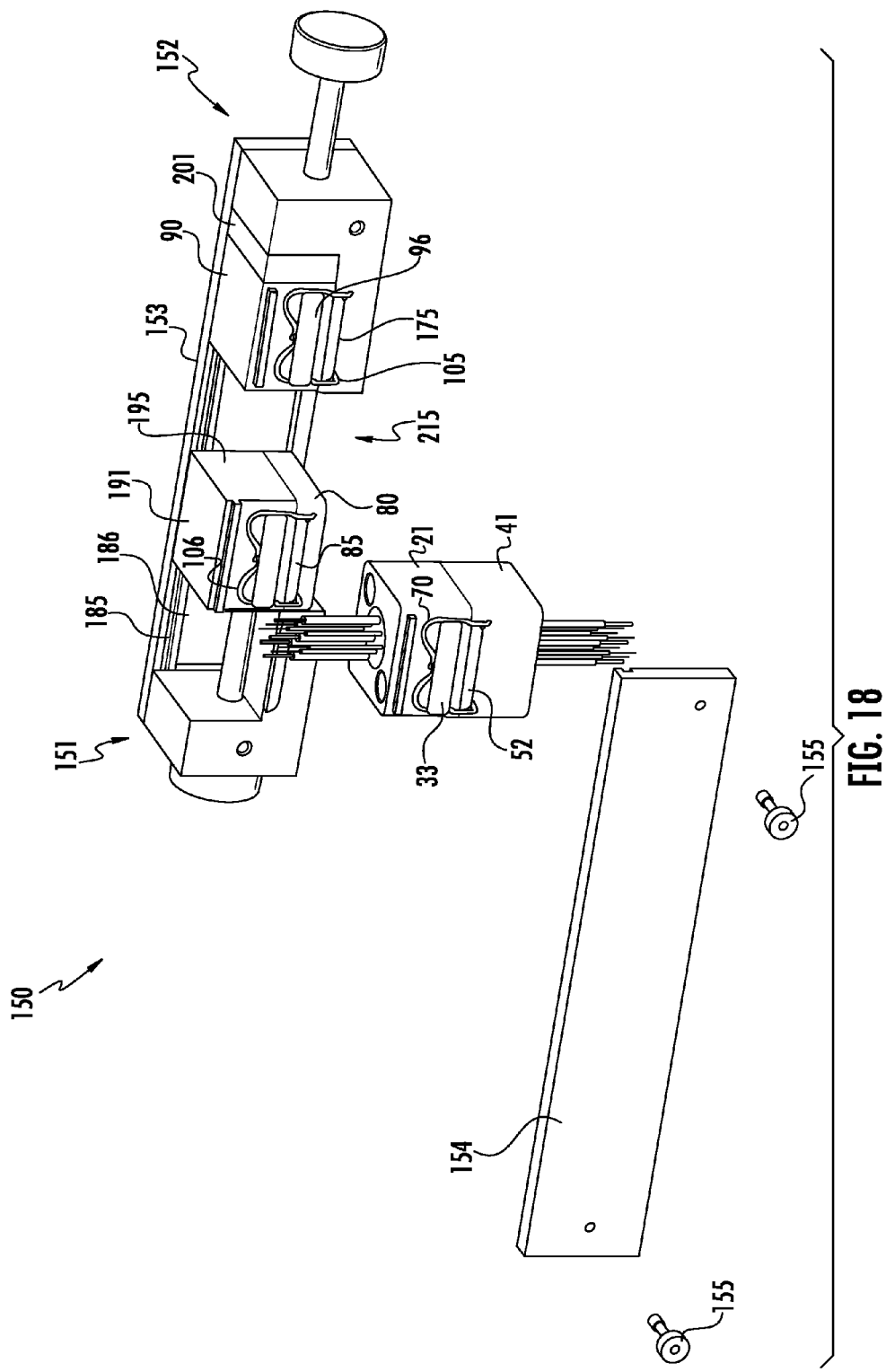
FIG. 18 is a perspective view of the tool with the mated pair of connectors removed from the tool and with the covers secured to the tool.
Figure 19:
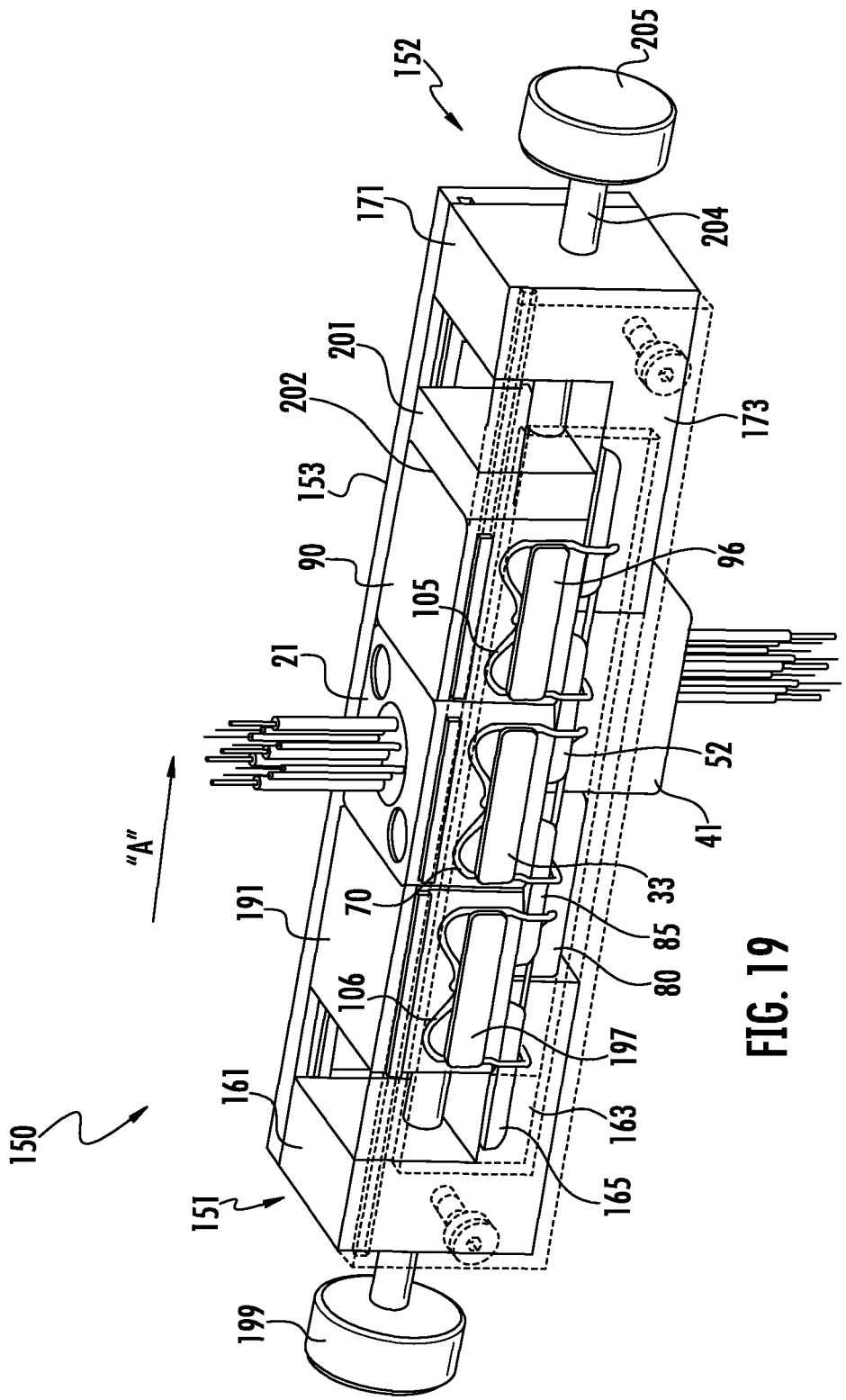
FIG. 19 is a perspective view of the tool with a pair of partially un-mated connectors positioned therein and with a sidewall of the tool depicted in phantom for clarity.

To unmate the upper connector 21 from the lower connector 41, the process is essentially reversed. Referring to FIG. 18, the removable sidewall 154 is removed from the mating end support 151 and the unmating end support 152. The large push block 191 is moved to its fully extended position spaced from upper surface 166 of second leg 163 of mating end support 151 and a lower cover 80 is slid onto the large push block with the front face 81 of the upper cover adjacent the lower face 192 of the large push block. The retention clips 106 mounted on the large push block 191 engage the guide and retention rails 85 of the lower cover 80 to secure the lower cover to the large push block. The shaft 204 and handle 205 of the unmating end support 152 are fully retracted with the small push block 201 adjacent first leg 171 of the unmating end support.

An upper cover 90 is slidably positioned on the second leg 173 of the unmating end support 152 with the front face 91 of the upper cover adjacent the upper surface 176 of the second leg. The retention clips 105 fixed to the upper cover 90 engage the guide and retention rails 175 of the second leg 173. A space between the end wall 195 facing the unmating end support 152 and the end wall 202 of the small push block 201 facing the mating end support 151 defines an opening or unmating nest 215 for positioning the mated pair of the upper connector 21 and the lower connector 41.

The mated pair of the upper connector 21 and the lower connector 41 are inserted into the unmating nest 215 with the guide projection 32 of the upper connector 21 positioned within the guide channel 185 of the fixed sidewall 153. Shoulder bolts 103 may be removed from the upper connector 21 and the lower connector 41 before or after the mated pair is inserted into the unmating nest 215. The removable sidewall 154 is secured to the mating end support 151 and the unmating end support 152 with the guide projection 32 of the sidewall 27 adjacent the removable sidewall 154 positioned within the guide channel 185 of the removable sidewall.

A force is applied to the handle 205 to move shaft 204 within the first leg 171 of the unmating end support 152 to push or drive the small push block 201 into contact with the upper cover 90. The engagement of the end wall 202 of the small push block 201 facing the mating end support 151 with the end wall 94 of the upper cover 90 facing the unmating end support 152 forces each of the large push block 191, the upper connector 21, and the upper cover 90 to slide generally opposite the path of travel "A" with the lower connector 41 and the lower cover 80 remaining fixed. The retention clip 70 fixed to the upper connector 21 slides from the guide and retention rail 52 of the lower connector 41 and onto the guide and retention rail 85 of the lower cover 80. The retention clip 105 fixed to the upper cover 90 slides from the guide and retention rail 175 of the unmating end support 152 and onto the guide and retention rail 52 of the lower connector 41. The retention clip 106 fixed to the large push block 191 slides from the guide and retention rail 85 of the lower cover and onto the guide and retention rail 165 of the mating end support 151. Once the small push block 201 has completed its movement to its unmated positioned (to the left in the figures), the upper connector 21 is aligned with the lower cover 80, the lower connector 41 is aligned with the upper cover 90 and the large push block 191 is retracted to its original position adjacent first leg 161 and on top of second leg 163 of mating end support 151. The removable end wall 154 is removed from the mating end support 151 and the unmating end support 152 to release the individual connectors and their respective covers from the tool 150.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber assembly for mating with a mating component along a mated axis, the optical fiber assembly comprising:
    a housing, the housing including a mating face for mating with the mating component;
    a ferrule, the ferrule including a plurality of optical fibers positioned therein;
    a lens plate including a lens array, the lens array comprising spaced apart lens elements, at least one lens element of the lens array being generally aligned with an optical fiber of the plurality of optical fibers; and
    a cover, the cover being slidably mounted on the housing adjacent the mating face;
    wherein:
        one of the housing and the cover includes a retention member; and
        the other of the housing and the cover includes a guide and retention member, the guide and retention member interacting with the retention member to retain the cover to the housing and permit sliding movement of the housing relative to the cover.

2. The optical fiber assembly of claim 1, wherein the retention member is resilient.

3. The optical fiber assembly of claim 2, wherein the retention member includes a resilient clip secured to opposite sides of the housing.

4. The optical fiber assembly of claim 1, further including a guide member, the guide member guiding the sliding movement of the housing relative to the cover.

5. The optical fiber assembly of claim 1, wherein the guide member includes an elongated guide rail positioned on opposite sides of the housing.

6. The optical fiber assembly of claim 5, wherein the sliding movement is generally parallel to the elongated guide rails.

7. The optical fiber assembly of claim 1, wherein the sliding movement is generally perpendicular to the mated axis.

8. The optical fiber assembly of claim 1, wherein the housing further includes at least one electrical contact therein.

9. The optical fiber assembly of claim 1, wherein the lens plate is positioned adjacent the ferrule.

10. The optical fiber assembly of claim 1, wherein the lens plate is generally cylindrical in shape having a front face and a generally flat rear face.

11. The optical fiber assembly of claim 1, wherein the lens plate is formed of an optical grade resin via injection molding.

12. The optical fiber assembly of claim 1, wherein the lens plate has a refractive index substantially matching that of the plurality of optical fibers.

13. The optical fiber assembly of claim 1, wherein the lens plate has a refractive index substantially matching that of water.

* * * * *